UNITED STATES PATENT OFFICE.

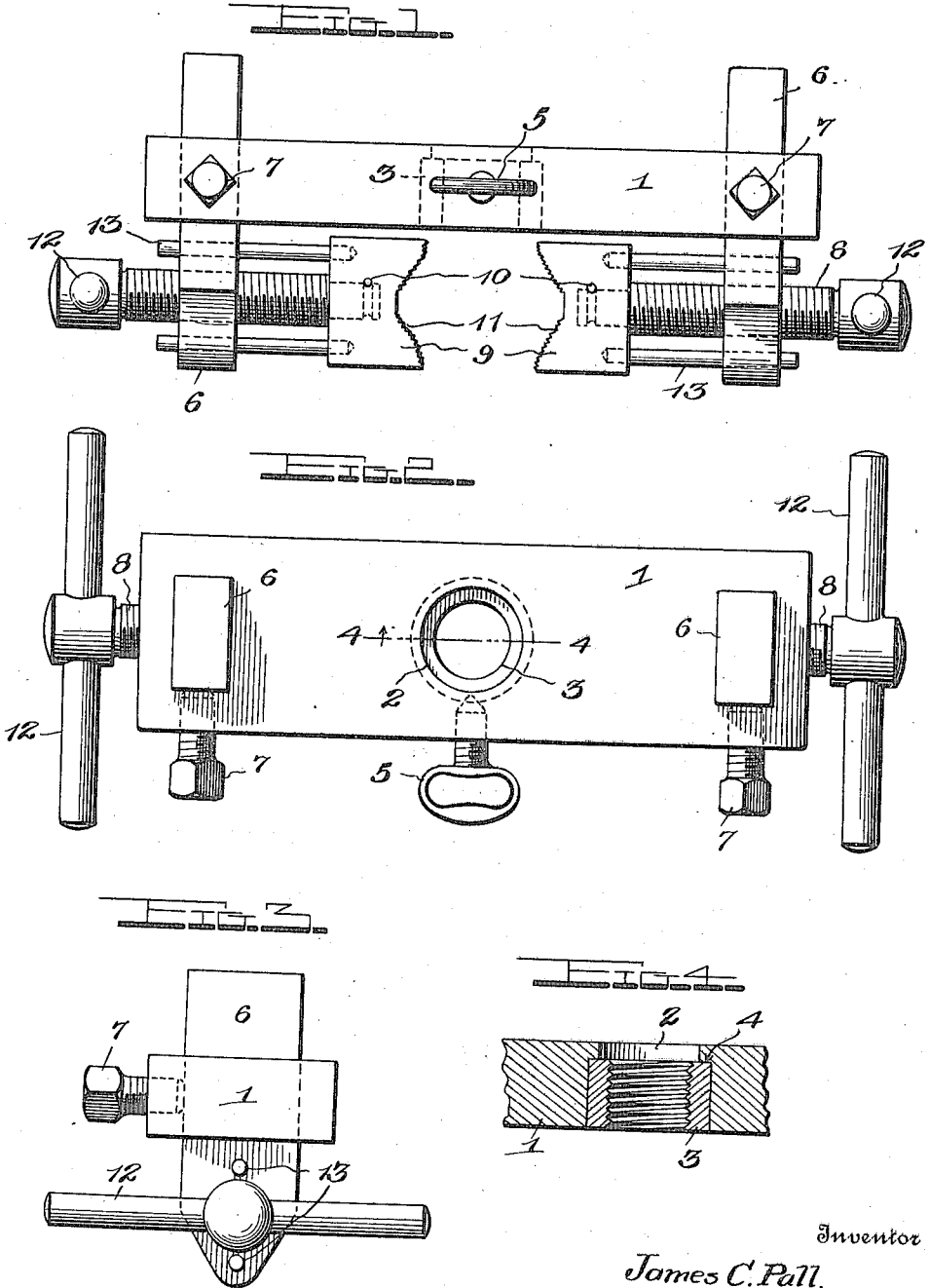

JAMES C. PALL, OF BRIDGEPORT, CONNECTICUT.

DEVICE FOR HOLDING, CENTERING, AND STEADYING TAPS.

1,221,897. Specification of Letters Patent. Patented Apr. 10, 1917.

Application filed September 20, 1916. Serial No. 121,207.

*To all whom it may concern:*

Be it known that I, JAMES C. PALL, a citizen of the United States, residing at the city of Bridgeport, county of Fairfield, State of Connecticut, have invented certain new and useful Improvements in Devices for Holding, Centering, and Steadying Taps; and I do declare the following to be a full, clear, and exact description of the invention, such as will enable others skilled in the art to which it appertains to make and use the same.

This invention relates to certain new and useful improvements in a device for holding, centering and steadying taps, and it has for an object to provide an appliance of this type which will operate efficiently in assembling the work and tap in proper positions preparatory to revolving the tap.

In tapping machines, it is very difficult to steady the tapping tool and center the same within the hole of the work to be tapped. This invention, therefore, has for a further aim to eliminate these disadvantages in a tapping device.

Further, the invention resides in the features of construction and arrangement of parts hereinafter described and claimed, the preferred embodiment being illustrated in the accompanying drawing wherein—

Figure 1 is a front elevation of the improved tapping device;

Fig. 2 is a top plan view thereof;

Fig. 3 is an end elevation of the tapping device; and

Fig. 4 is a fragmentary section on line 4—4 of Fig. 2.

Referring more in detail to the drawing, the numeral 1 designates a top bar or plate having a central opening 2 mortised out for the reception of a bushing 3 which is retained seated on the annular shoulder 4, in the opening, by a set screw 5.

Adjacent each end, the top bar is provided with a rectangular opening through which slidably extends a support 6 held fixed in adjusted positions by a set screw 7 threaded in the bar 1. These supports are bar-like and disposed in parallel relation, each having its outer end portion formed with a screw-threaded opening through which is passed a clamping screw 8. The screws extend toward each other and carry on their inner opposing ends the clamping jaws 9 to which they are swivelly connected, as depicted at 10 in Fig. 1. The jaw faces 11 are properly serrated and shaped to grip efficiently the piece of work of any shape in cross section, suitable handles 12 being provided on the outer ends of the screws for rotating them in their supports to advance and retract the jaws.

Each jaw has fixed thereto a pair of rearwardly extending steadying rods 13 which are freely guided in apertures formed in the respective support to hold the jaw properly disposed and against turning with the screws.

The tapping tool (not shown) is threaded externally to engage with the threads of the bushing 3, the lower end of the tool being of the usual form.

The work is clamped between the jaws 9 so as to have its hole centered with respect to the tapipng tool. The bar 1 may then be adjusted up or down on the supports 6 and secured at the desired adjustment by set screws 7. The device may be suitably mounted on the platen of a drill press or otherwise supported, the rotary spindle of the drill being engaged to the upper part of the tap as by a chuck (not shown).

It will therefore be noted, that this appliance not only clamps the work but accurately locates the tap with respect to the hole to be threaded before the work is actually held by the jaws. Further, the tap is reinforced and steadied by the bushing, and in the event that the tap breaks it may readily be removed from the bushing and a new tap substituted. Bushings having threads of different pitch and style may readily be substituted at will.

What is claimed is:

1. In a device of the character described, a plate having a central opening and spaced end openings, the central opening having a counterbored portion to form a shoulder, an internally threaded bushing seated on the shoulder and adapted to receive a tapping tool, means to hold the bushing seated, a support slidable in each end opening of the plate and provided with a threaded opening in its outer end, a set screw in the plate engaging each support to hold the plate adjusted thereon, a clamping screw in the opening of each support, a jaw swiveled on the inner end of each screw, and rearwardly extending steadying rods fixed to the jaws and slidably engaged with the respective supports.

2. In a device of the character described, a plate having a central opening and spaced end openings, the central opening having a counterbored portion to form a shoulder, an internally threaded bushing seated on the shoulder and adapted to receive a tapping tool, means to hold the bushing seated, a support slidable in each end opening of the plate and provided with a threaded opening in its outer end, a set screw in the plate engaging each support to hold the plate adjusted thereon, and coöperating jaws adjustable on the supports.

3. In a device of the character described, a plate having a central opening and spaced end openings, the central opening having a counterbored portion to form a shoulder, an internally threaded bushing seated on the shoulder and adapted to receive a tapping tool, means to hold the bushing seated, a support slidable in each end opening of the plate and provided with a threaded opening in its outer end, a set screw in the plate engaging each support to hold the plate adjusted thereon, a clamping screw in the opening of each support, and jaws on the screws having coöperating serrated jaw faces.

4. In a device of the character described, a plate having openings near its ends and an opening intermediate said end openings, a support slidable in each end opening and provided with a threaded opening in its outer end, means for adjustably securing each support to said plate, a clamping screw in the opening of each support, clamping jaws carried by the inner ends of the screws, and an interiorly threaded bushing detachably secured within said intermediate opening and adapted to receive a tapping tool.

In testimony whereof I affix my signature in presence of two witnesses.

JAMES C. PALL.

Witnesses:
  F. W. SMITH, Jr.,
  M. T. LONGDEN.

Copies of this patent may be obtained for five cents each, by addressing the "Commissioner of Patents, Washington, D. C."